US009343110B2

(12) United States Patent (10) Patent No.: US 9,343,110 B2
Raymond et al. (45) Date of Patent: May 17, 2016

(54) DYNAMIC SYNCHRONIZATION TOOL

(75) Inventors: Art Raymond, Highlands Ranch, CO (US); Danny Gold, Denver, CO (US); Dave Lamy, Owens X Rds., AL (US)

(73) Assignee: LEVELS BEYOND, Englewood, CO (US)

( * ) Notice: Subject to any disclaimer, the term of this patent is extended or adjusted under 35 U.S.C. 154(b) by 1081 days.

(21) Appl. No.: 12/952,871

(22) Filed: Nov. 23, 2010

(65) Prior Publication Data
US 2012/0131461 A1 May 24, 2012

(51) Int. Cl.
*G06F 3/01* (2006.01)
*G11B 27/10* (2006.01)

(52) U.S. Cl.
CPC .............. *G11B 27/10* (2013.01); *G11B 27/105* (2013.01)

(58) Field of Classification Search
None
See application file for complete search history.

(56) References Cited

U.S. PATENT DOCUMENTS

| 7,050,110 | B1 | 5/2006 | Lienhart et al. |
| 8,218,764 | B1 * | 7/2012 | Kline ............................. 380/215 |
| 8,307,286 | B2 * | 11/2012 | Sterner .................. G06Q 30/00 715/716 |
| 2008/0154908 | A1 * | 6/2008 | Datar et al. ..................... 707/10 |
| 2009/0297118 | A1 | 12/2009 | Fink et al. |
| 2010/0036423 | A1 * | 2/2010 | Hayes et al. .................. 606/260 |
| 2010/0095211 | A1 * | 4/2010 | Kenvin et al. ................. 715/723 |
| 2010/0293190 | A1 * | 11/2010 | Kaiser ..................... G06F 3/048 707/769 |
| 2010/0325547 | A1 * | 12/2010 | Keng et al. .................... 715/723 |

* cited by examiner

*Primary Examiner* — Matt Kim
*Assistant Examiner* — Tuan S Nguyen

(57) ABSTRACT

The present disclosure relates to systems and methods for synchronizing one or more mediatations with a video timeline. A mediatation may refer to any media content displayed in a separate window from a video stream. Example mediatations include, but are not limited to, portable document format (PDF) documents, text documents, and image documents. Mediatations are associated with a timeline for a video stream. As the video stream is played, different indications of mediatations may appear in a window separate from the window playing the video. A user may then select an indication of a mediatation to display the entirety of the mediatation.

20 Claims, 10 Drawing Sheets

DYNAMIC SYNCHRONIZATION TOOL

INTRODUCTION

Use of multimedia content in every day life is becoming increasingly common. Many organizations, educational institutions, and media industries utilize various types of multimedia content on a daily basis. Increased usage of media content has spurred a need for a more intuitive process of media tagging, searching, and storing. It is in this general context that the present application is presented.

BRIEF DESCRIPTION OF THE DRAWINGS

The following drawing figures, which form a part of this application, are illustrative of embodiments systems and methods described below and are not meant to limit the scope of the technology in any manner.

SUMMARY

Figure 1:
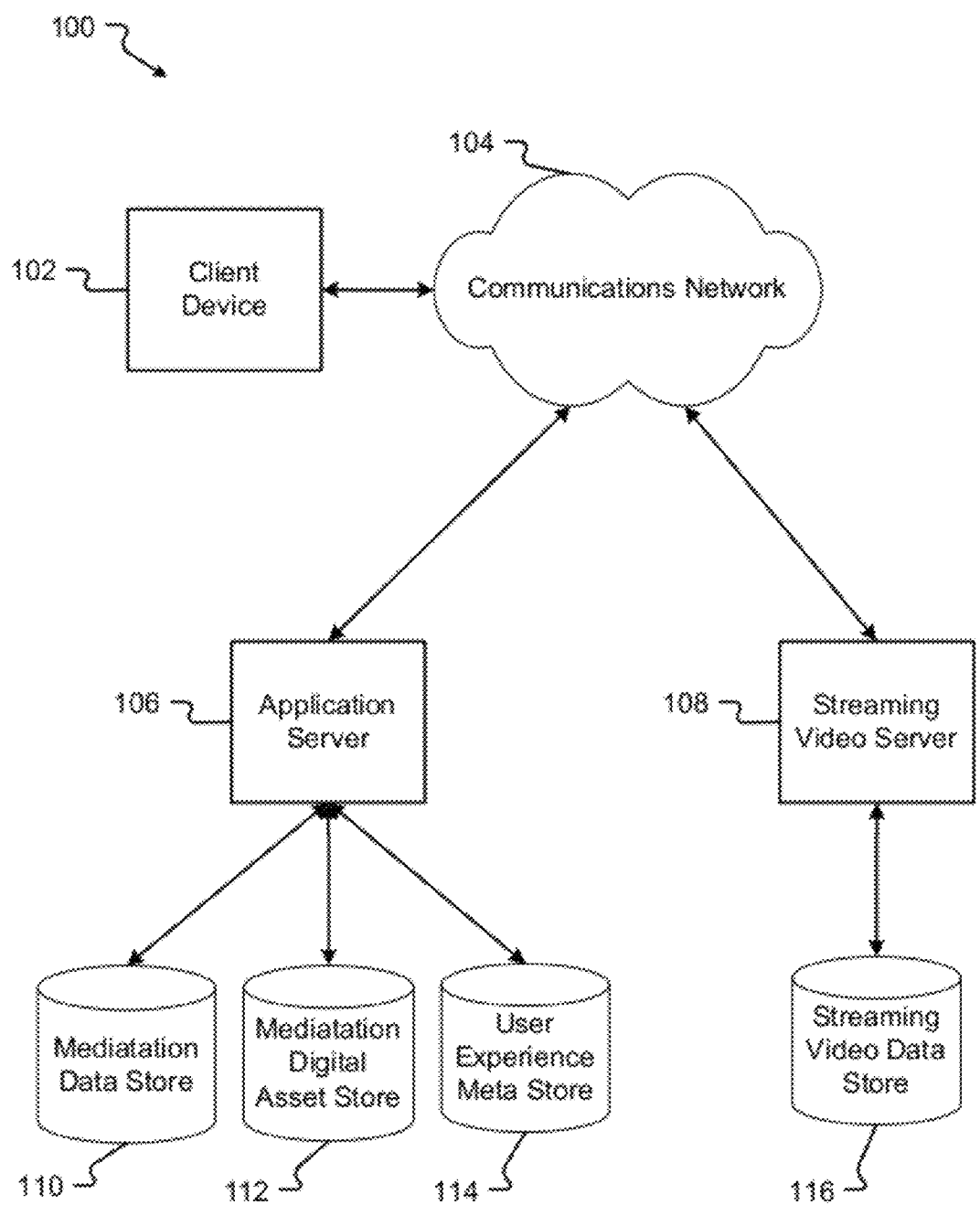
FIG. 1 illustrates a general overview of an information retrieval and communication network

The present disclosure relates to systems and methods of improved media tagging and presentation. Specifically, the present disclosure provides systems and methods for synchronizing one or more mediatations with a video timeline. In one embodiment methods and systems for synchronizing display of media content with a video timeline are provided. A client receives, separately, a base video stream and a list of one or more mediatations associated with the base video stream. When the base video stream begins playing, the video timeline is monitored. During a first period of the timeline, an indication of a first mediatation is displayed separate from the base video stream. Upon receiving a command to display the first mediatation, the first mediatation is then displayed separately from the base video stream.

In another embodiment, a method is provided for synchronizing display of media content with a video timeline. A request is received for a list of one or more mediatations associated with a base video stream. In response to the request, a list of one or more mediatations is sent. After receiving an indication that the base video is playing, first mediatation is determined from the list of one or more mediatations. The timeline is then monitored and, upon reaching the first period in the timeline, an indication of the first mediatation associated with the first period in the timeline is retrieved. The indication of the first mediatation is then sent for display. Upon receiving a request for the first mediatation, the first mediatation is sent for display in a window separate from the base video stream.

DETAILED DESCRIPTION

The present disclosure relates to systems and methods for synchronizing one or more mediatations with a video timeline. For the purposes of this disclosure, a mediatation may refer to any media content displayed in a separate window from a video display that is associated with a period of the video stream. Windows may include one or more elements, or display areas, and, additionally, may provide graphical displays, instructions, or other useful information. A "separate" window may include any area outside of the video display. Example mediatations include, but are not limited to, portable document format (PDF) documents, text documents, and image documents. Mediatations are associated with a timeline for a video stream. As used herein, "video stream" refers to any visual media that includes a timeline and that is capable of being rendered on a video media player, including streaming video, and video that is stored locally, remotely, or on removable storage devices, regardless of how such video is delivered to a video player. As the video stream is played, different indications of mediatations may appear in a window separate from the window playing the video. For example, the video stream may be a recorded lecture given by a professor. The professor may then mediatate the video by associating one or more mediatations with the timeline. As the lecture plays, different indications of mediatations, such as practice questions, diagrams, or supplementary articles may appear in a window separate from the video stream. The indications may comprise previews of the mediatation itself. For example, an indication may be the first practice question of a practice question set, a portion of a diagram, a description of the mediatation, or a thumbnail of PDF article. The indications of mediatations are displayed separately from the window playing the video so the user can view the video stream and the indication of the mediatation at the same time. A user may then select an indication of a mediatation to access the entirety of the mediatation. For example, a user may want to read the entirety of a PDF article. The user can select the thumbnail of the PDF. The entire PDF article will then be provided for user interaction within the mediatation display window.

The video timelines may be mediatated by users other than the creator of the video stream. For example, a classmate or group project member could mediatate the professor's video stream from the above example. A user's ability to mediatate may be controlled by the user's permissions and rules set for mediatation of the video timeline. For example, a user's credentials presented at login may indicate to a mediatation application that the user is not permitted to mediatate certain portions of the video timeline. Alternatively, rules set for mediatation of the video timeline may indicate to the mediatation application that a certain user's mediatations should be mandatory for the video timeline, requiring all viewing users to display the mandatory mediatations. A viewing user could also filter mediatations so that indications of only a certain user's or certain types of mediatations are displayed for view.

FIG. 1 illustrates a general overview of an exemplary information retrieval and communication system 100 suitable for performing embodiments described herein. FIG. 1 represents embodiments of a network including an application server 106, a streaming media server 108, a client device 102, a mediatation data store 110, a mediatation digital asset store 112, an user experience meta store 114, and a streaming video data store 116. In computer network 100, client device 102 is coupled to the communications network 104. Only one client device 102 is shown, but it is understood that more than one client device may be communicatively coupled to the communication system 100 either individually or in a distributed manner, and that other servers providing additional functionality may also be interconnected to any component shown in system 100 either directly, over a LAN or a WAN, or over the Internet. Moreover, the system 100 may operate in a cloud computing environment.

Several elements in the system shown in FIG. 1 are conventional, well-known elements that need not be explained in detail here. For example, each client device 102 could be a desktop personal computer, workstation, cellular telephone, personal digital assistant (PDA), laptop, or any other device capable of interfacing directly or indirectly with the communications network 104. Each client 102 typically runs a browsing program, such as Microsoft's Internet Explorer, Mozilla Firefox, Safari or the like, or a micro browser such as a WAP enabled browser in the case of a cell phone, PDA or other handheld wireless devices, allowing a user of client 102 to browse pages and forms available to it from application server 106, streaming video server 108, or other servers over communications network 104. Each client device 102 also typically includes one or more user interface devices, such as a keyboard, a mouse, touch screen, pen or the like, for interacting with a graphical user interface (GUI) provided by the browser on a monitor screen, LCD display, etc., in conjunction with pages and forms provided by application server 106, streaming media server 108 or other servers. The present disclosure is suitable for use with the any communications network 104 Internet, which refers to a specific global Internetwork of networks. However, it should be understood that other networks can be used instead of the Internet, such as an intranet, an extranet, a virtual private network (VPN), a non-TCP/IP based network, peer-to-peer networks, any LAN or WAN or the like and combinations thereof.

Application server 106 and streaming video server 108 and any related components are operator configurable using an application including computer code run using a central processing unit such as an INTEL CORE processor or the like. Computer code for operating and configuring application server 106 and streaming video server 108 as described herein is preferably stored on a hard disk, but the entire program code, or portions thereof, may also be stored in any other memory device such as a ROM or RAM, or provided on any media capable of storing program code, such as a compact disk medium, a floppy disk, or the like. Additionally, the entire program code, or portions thereof may be downloaded from a software source to application server 106 or streaming video server 108 over the Internet as is well known, or transmitted over any other conventional network connection as is well known, e.g., extranet, VPN, LAN, etc., using any communication medium and protocol as are well known. Additionally, portions of the program code may be downloaded or provided to client device 102 and executed on client device 102.

In one embodiment, communication system 100 further includes a mediatation data store 110, a mediatation digital asset store 112, an user experience meta store 114 and a streaming video store 116. The streaming video data store 116 is communicatively coupled to the streaming video server 108. The streaming video data store 116 stores video streams and timelines associated with those videos. The mediatation data store 110, mediatation digital asset store 112, and user experience meta store 114 are communicatively connected to the application server 106. The mediatation data store 110 stores links between mediatations stored in the mediatation digital asset store 112 and the video timeline. The links could be of any form, including but not limited to XML structures or data tables. The mediatation digital asset store 112 stores mediatations associated with the video timeline stored in the streaming video data store 116. As discussed above, mediatations may include, but are not limited to, portable document format (PDF) documents, text documents, and image documents. The user experience meta store 114 stores user experience information. For the purposes of this disclosure, user experience information includes one or more rules that affect the way in which mediatations are displayed in concert with the video timeline. For example, the user experience information may include a rule that makes display of a mediatation or group of mediatations mandatory. On the other hand, user experience information may also include a rule that makes display of another mediatation or group of mediatations optional. The user experience information may also include rules regarding user permissions to view certain mediatations. Information stored on the mediatation data store 110, mediatation digital asset store 112, and user experience meta store 114 is conveyed to the application server 106 during play of the video to determine which mediatations are provided to a viewing user.

In one embodiment, video play by the application is described in the context of streaming video. However, in another embodiment, video play may include retrieving video stored locally, by download or otherwise, and played. For example, a video may be stored locally on client device 102. In one embodiment, illustrated in FIG. 1, video may be uploaded and stored in the streaming video data store 116. The stored video may then be accessed by the streaming video server 108 when a request for video play is received.

In one embodiment, a web browser at the client device 102 is communicatively coupled to an application running on application server 106 and an application running on the streaming video server 108. However, it should be appreciated that the present disclosure is not limited to browser-based applications and could be deployed as a desktop application, a mobile application, etc. The web browser at the client device 102 is configured to coordinate information received from the application server 106, which receives information from mediatation data store 110, mediatation digital asset store 112, and user experience meta store 114, with information received from the streaming video server 108, which receives information from streaming video data store 116. This information is used to display one or more mediatations synchronously with a video timeline as will be described in detail below.

Figure 2:
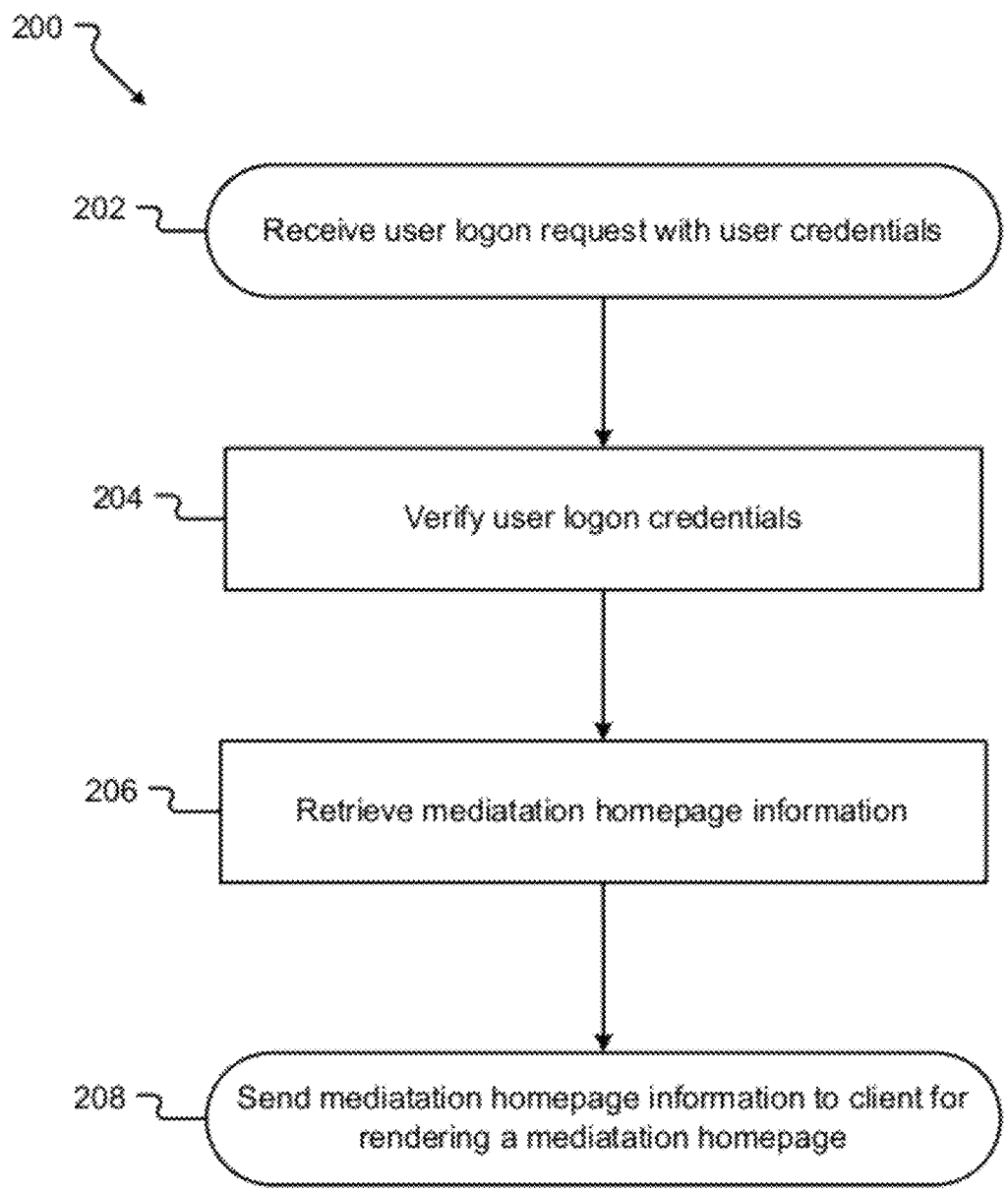
FIG. 2 illustrates an embodiment of a method for logging into an application for synchronizing one or more mediatations with a video timeline.

FIG. 2 illustrates an embodiment of a method for logging into an application for synchronizing one or more mediatations with a video timeline. "Video timeline" and "timeline" as used in this application comprise a representation of the time span of a currently displayed video that may be associated with one or more mediatations. In other words, the video timeline provides a chronological display of the video in a linear fashion, such as will be discussed in further detail below. In one embodiment, the application is a web based application hosted in a browser supported environment and is reliant on a common web browser to render the application executable as described with reference to FIG. 1. The method 200 commences at a receive operation 202 when a user logon request and user credentials are received. In one embodiment, user credentials may include a user name and password. These user credentials are sent in the user logon request from the web browser application to the application server. Once user credentials are received, flow proceeds to a verify operation 204.

At verify operation 204, the user credentials are verified. In one embodiment, the application server sends the user credentials to the user experience meta store. The user experience meta store stores user credential information. The provided user credential information is compared to the previously stored user credential information. If the user credentials do not match, flow terminates. If the user credentials match, flow proceeds to a retrieve operation 206.

At retrieve operation 206, the mediatation homepage information is retrieved. The mediatation homepage information is the information necessary to render the mediatation homepage at the client. For example, mediatation homepage information may include code necessary to communicate with a client side application to render user interface objects at the client device. Such code may be conveyed in a rendering language, including but not limited to Java and JavaScript. In one embodiment, this information is stored at the application server. Once the mediatation homepage information is retrieved, flow proceeds to a send operation 208.

At send operation 208, the mediatation homepage information is sent to the client to render the mediatation homepage. Flow then terminates. Once the mediatation homepage is rendered at the client, the client may begin displaying mediatations synchronously with a video timeline as will be described in detail below.

Figure 3:
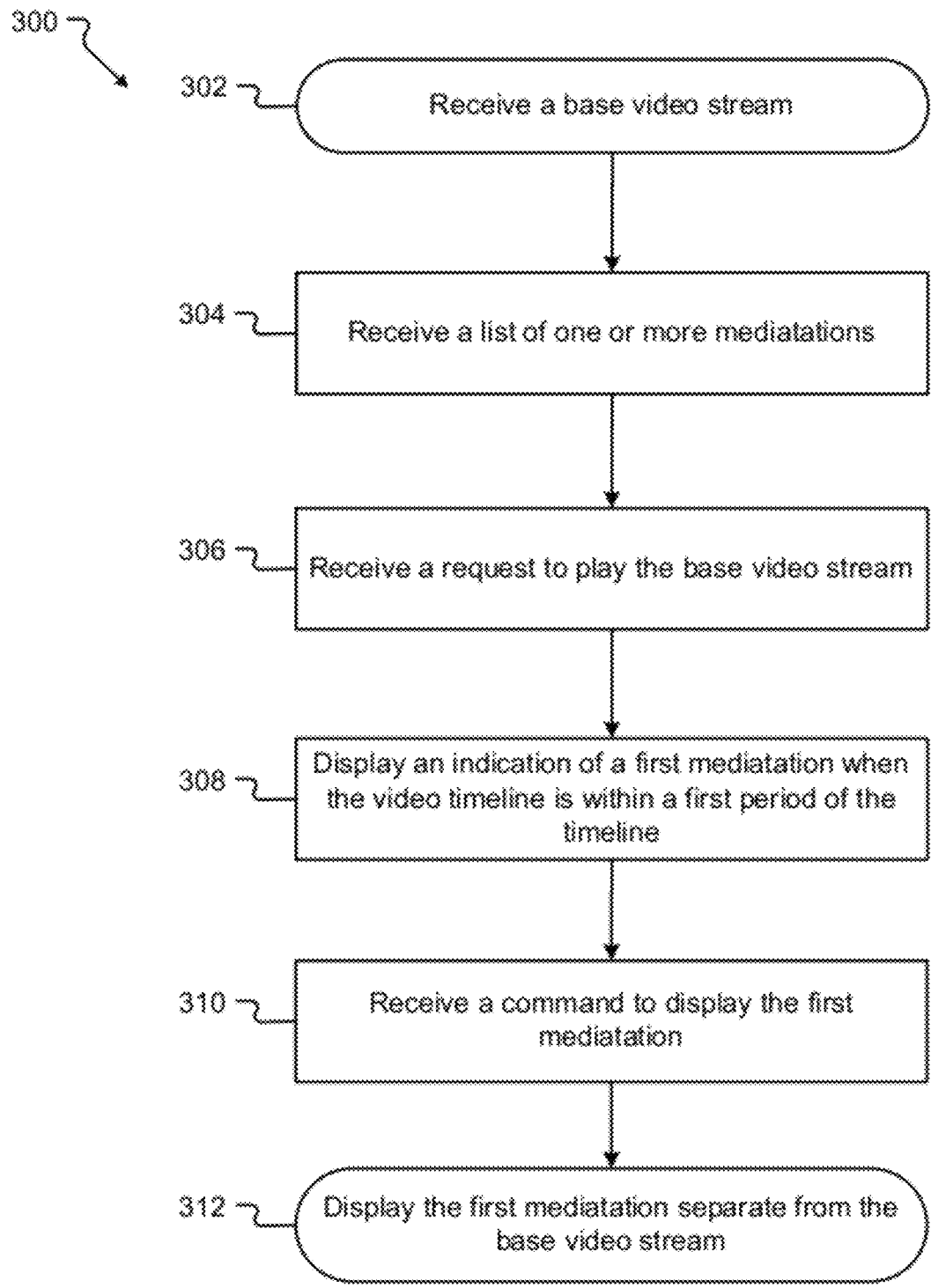
FIG. 3 illustrates an embodiment of a method for synchronously displaying a mediatation with a video timeline at the client.

FIG. 3 illustrates an embodiment of a method for synchronously displaying one or more mediatations in association with a video timeline. The method 300 commences with a receive operation 302 when a base video stream is received at the client. A base video stream may be received in response to a client side request. In one embodiment, a client may issue a search request for a particular video stream. In another a client may issue a search request for a particular mediatation. The request for the particular mediatation will provide the client with the associated video stream at the point in the timeline associated with the requested particular mediatation. Flow proceeds to a receive operation 304. It will be appreciated that one or more of the steps of method 300 or other methods described herein may be performed in parallel or in different order than depicted.

At receive operation 304, a list of one or more mediatations is received. In embodiments, the receive operation 304 is performed at the same time as receive operation 302. In one embodiment, the list is in a tabular format comprising various columns. Entries in a first column may include a brief description of the mediatation, entries in a second column may contain a reference to the format type of the mediatation, and entries in a third column may include a reference to the period in the video timeline that the mediatation is associated with. In one embodiment, the entries in the columns are linked to a point in the timeline with which the mediatation is associated. For example, in embodiments, the link allows a user, upon selection of the entry, to "jump" the base video stream to the beginning of that period in the timeline with which the mediatation is associated. Flow proceeds to a receive operation 306.

At receive operation 306, a request is received to play the base video stream. In one embodiment, this request is received by the web browser at the client and may be performed before completion of steps 302 and 304. The web browser may recognize client input, such as selection of a play button, as a request to play the base video stream. In embodiments, the base video stream is played automatically, and no separate request to play the base video is required. Flow proceeds to a display operation 308.

At display operation 308, an indication of a first mediatation is displayed when the video is playing within a first period of the timeline. For purposes of this disclosure, an indication may include a preview of the full mediatation. For example, the indication of the first mediatation may be a thumbnail of a PDF while the first mediatation is the PDF itself. The indication of the first mediatation is displayed in a separate display area from the base video stream. Displaying the indication in a display area separate from the window displaying the base video stream allows a user to view both the indication and the base video stream simultaneously. The indication of the first mediatation is associated with a first period of the timeline. This first period may be set to any length of time. In embodiment, a web browser on a client machine is configured to coordinate display of the indication of the first mediatation with the first period of the timeline. When the video timeline, i.e. the timeline associated with the currently displayed video, reaches the period associated with the indication of the first mediatation, the web browser displays, in a display area separate from the video, the indication of the first mediatation received from the application server. Once the indication of the first mediatation is displayed, flow proceeds to a receive operation 310.

At receive operation 310, a command to display the first mediatation is received by the web browser. In one embodiment, a user may select the indication of the first mediatation, and this selection is interpreted as a command to display the first mediatation. In another embodiment, the user may select the brief description of the first mediatation in the list of mediatations to display the first mediatation. In embodiments, multiple mediatations may be associated with a particular period of the timeline. Accordingly, multiple indications of mediatations may be displayed simultaneously. In embodiments, mediatations may also be accessed and displayed automatically. Once the command to display the first mediatation is received, the request is relayed from the web browser to the application server. Flow then proceeds to a display operation 312.

At display operation 312, the first mediatation is displayed in the display area separate from the display area displaying base video stream. As discussed above, the first mediatation corresponds to the indication of the first mediatation. For example, if the indication of the first mediatation provided a thumbnail view of a PDF document, the first mediatation may comprise some or all of the actual PDF document. Flow then terminates.

Figure 4:
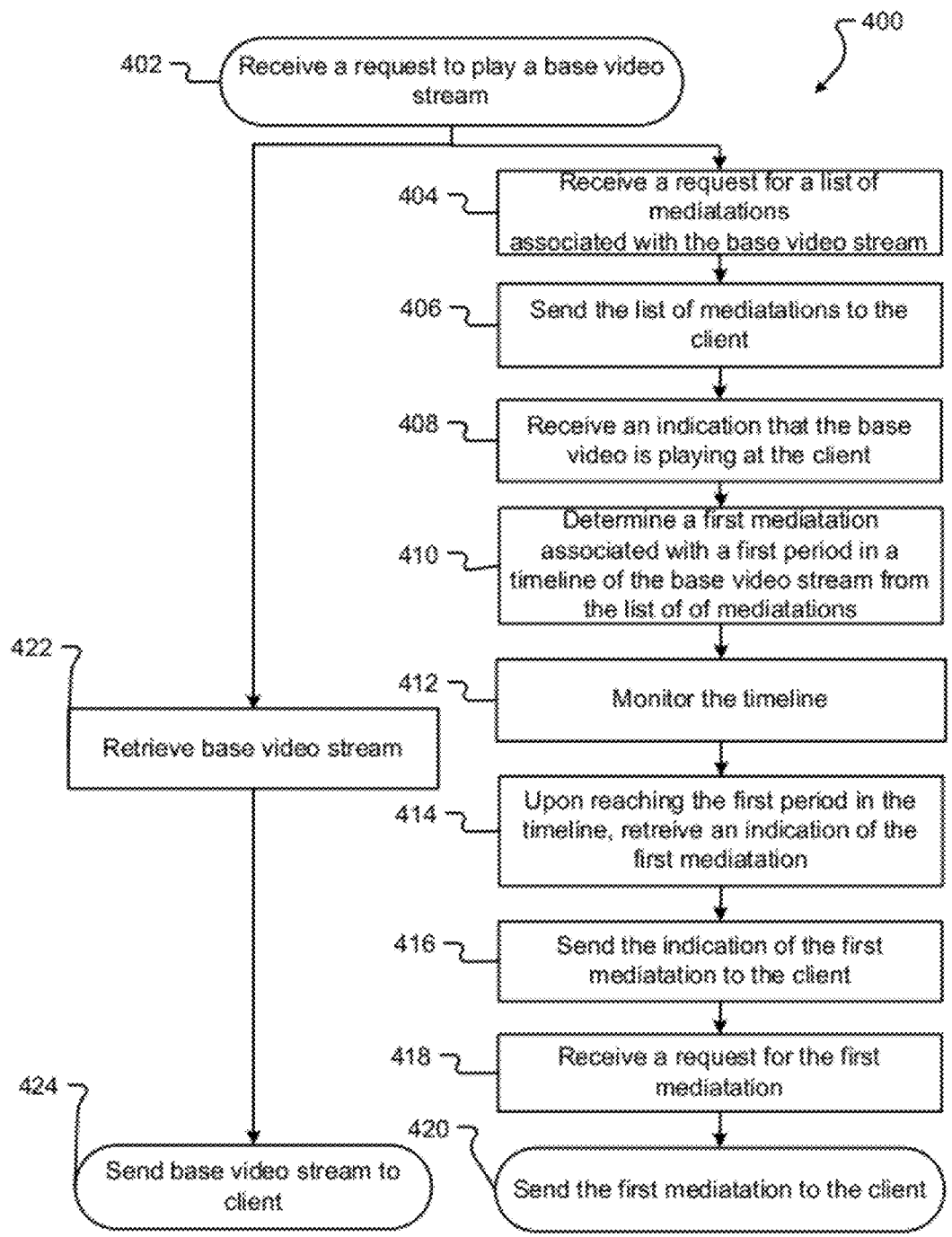
FIG. 4 illustrates an embodiment of a method for providing mediatations for synchronous display with a video timeline at the client.

FIG. 4 illustrates an embodiment of a method for providing mediatations for synchronous display with a video timeline at the client. The method 400 commences with receive operation 402 where a request to play a base video stream is received. In embodiments, the request to play the base video stream is conveyed from the client and received by both the application server and the server storing the base video stream, such as a streaming video server. In embodiments, an application server, such as application server 106 in FIG. 1, performs the operations as represented by the flow on the right side of FIG. 4 (operations 404-420). The process followed by a streaming video server, such as streaming video server 108 in FIG. 1, is represented by flow on the left side of FIG. 4 (operations 422-426). Each process will be discussed in turn.

When the request to play the base video stream is received, flow proceeds to operation 404 at which a request for a list of meditations associated with the base video stream is received. In one embodiment, the list of meditations includes all meditations associated with the base video stream. In another embodiment, the list of meditations corresponds to the meditations that the user has permission to access or that the user has indicated a preference to receive. The meditations associated with the video may be sorted based on these permissions and/or preferences and only those meditations that the user has permission and/or preference to access are sent. In another embodiment, certain mandatory meditations will always be included in the list of meditations. The user permissions/preferences and mandatory/optional meditation rules may be retrieved by the application server from a user experience meta store, such as user experience meta store 114, as discussed above. In yet another embodiment, the list of meditations may be filtered on the client side. For example, the client, such as client device 102 in the embodiment described with respect to FIG. 1, may only want to view meditations that were created by a user's professor. In embodiments, a larger set of meditations may be sent in the meditation list, where it is filtered by the client. The user may select that only meditations created by the professor are displayed in the list of meditations. Once the request for the list of meditations is received, flow proceeds to send operation 406.

At send operation 406, the list of meditations is sent (e.g. by application server 106) to client (e.g. client machine 102). As discussed above, the list of meditations allow the user to select and view information about the meditations associated with the base video stream. Moreover, the list of meditations may allow the user to select a meditation in the list and "jump" the video timeline to the period in the timeline associated with the selected meditation. Rather than playing the base video continuously, a user may then be able to view only those portions of the base video associated with particular meditations. Flow proceeds to receive operation 408.

At receive operation 408, an indication that the base video is playing at the client is received. In embodiments, the indication informs the application server where in the video timeline the base video will start playing from. This information is generally available, for example, in packets required by use of standard streaming media protocols, such as Real-Time Streaming Protocol (RTSP), Real-Time Transport Protocol (RTP), and Real-Time Transport Control Protocol (RTCP). In one embodiment, the user wants to play the video from the beginning and the application server (such as application server 106) will receive an indication that the base video will start playing at time zero. The user, however, does not need to start video play from the beginning. For example, the user may have selected a midway point on the timeline (or any other point) to start play from. As discussed, this is accomplished in embodiments by a user jumping to different periods in the video timeline by selecting meditations from the list of meditations that are associated with such period. Flow proceeds to determine operation 410.

At determine operation 410, a first meditation associated with a first period in the timeline of the base video stream from the list of meditations is determined. The determination of a first meditation in the timeline is based upon the point in the timeline that the base video began playing. For example, if the base video began playing at time zero, the first meditation would be the meditation in the list of meditations associated with the earliest period in the timeline. On the other hand, if the base video began playing at a midway point, the first meditation would be the meditation in the list of meditations associated with the earliest period in the timeline after that starting point. In embodiments, an associated period is fixed and pre-determined for each meditation. Flow proceeds to monitor operation 412.

At monitor operation 412, the video timeline is monitored. In embodiments, the timeline at the application server mirrors the timeline at the client. By monitoring the timeline, the application server is able to provide the client with indications of meditations without requiring client side request and response. This can be facilitated by the client addressing all video-control commands to both the application server (such as application server 106) and the streaming video server (such as streaming video server 108). Effectively, the application server can track where the client is in video playback using the same techniques used by the streaming video server. Flow then proceeds to retrieve operation 414.

At retrieve operation 414, upon reaching the first period in the timeline, an indication of the first meditation is retrieved. As discussed above, the first period in the timeline is the period associated with the first meditation. Once this period is reached, an indication of the first meditation is retrieved. In one embodiment, the application server retrieves the link between the period in the timeline and the indication of the first meditation from a meditation data store, such as meditation data store 110. Using the retrieved link, the application server (such as application server 106) may then retrieve the indication of the first meditation from the meditation digital asset store (such as meditation digital asset store 112). As discussed above, the indication of the first meditation provides a preview of the first meditation. Flow proceeds to send operation 416.

At send operation 416, the indication of the first meditation is sent to the client. Once the indication of the first meditation is sent to the client, flow proceeds to receive operation 418. In embodiments, one or both of operations 412 and 414 may be performed at the client, in which case operation 416 may not be necessary.

At receive operation 418, a request for the first meditation is received. As discussed above, the first meditation provides the client with the media content that was previewed by the indication of the first meditation. In one embodiment, the application server retrieves the first meditation from the meditation digital asset store. Flow then proceeds to send operation 420. At send operation 420, the first meditation is sent to the client.

In embodiments, the flow of operations 422-424 proceeds concurrently with the flow of operations 404-420.

At retrieve operation 422, the base video stream is retrieved by the streaming video server (such as streaming video server 108). In one embodiment, the streaming video server retrieves the base video stream from the streaming video data store (such as streaming video data store 116). At send operation 424, the base video stream is sent from the streaming video server to the client. In embodiments, send operation 424 comprises streaming the video to the client.

Figure 5:
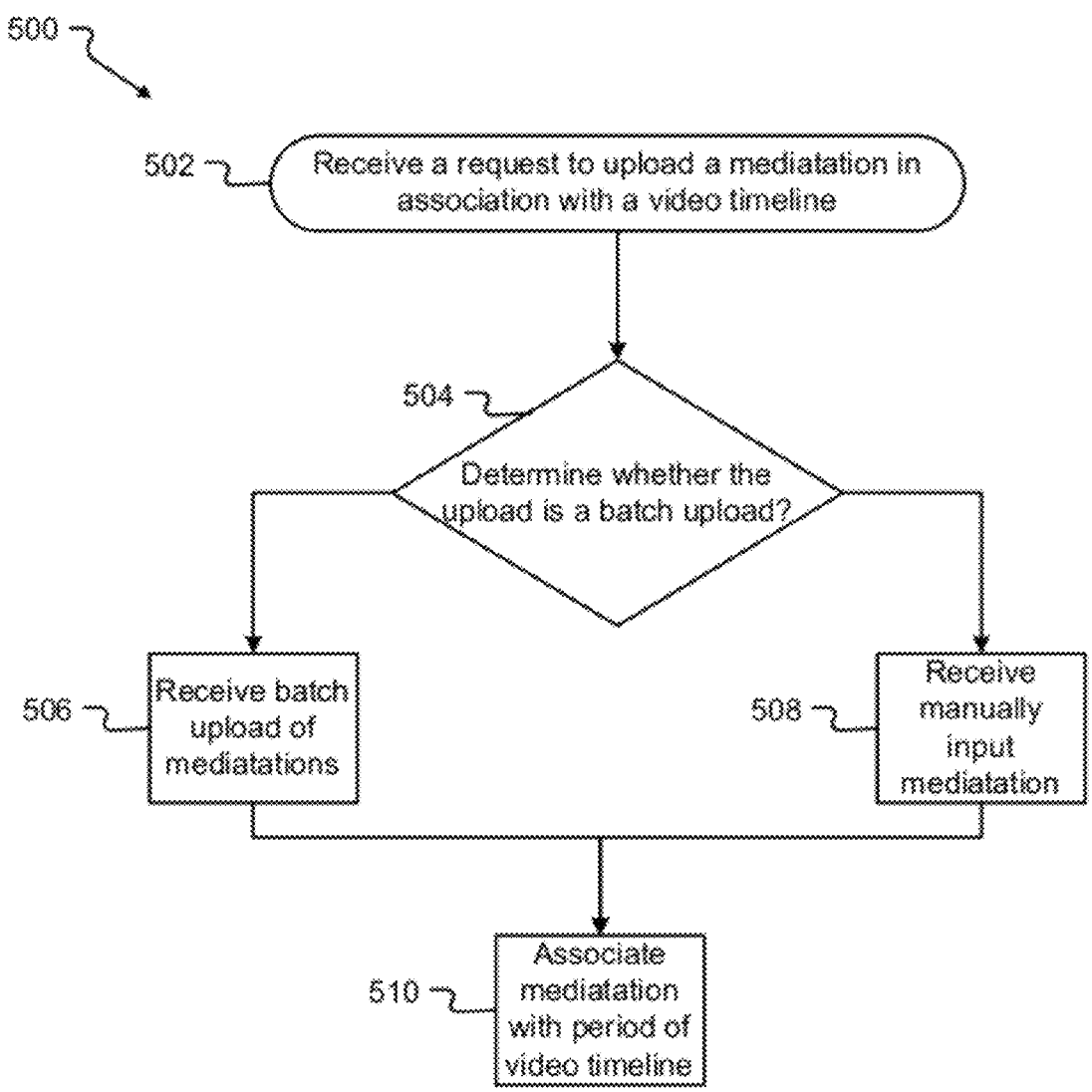
FIG. 5 illustrates an embodiment of a method for uploading a mediatation in association with a video timeline.

FIG. 5 illustrates an embodiment of a method for uploading a meditation in association with a video timeline. Meditations may be added by any user or administrator with permission to do so. For example, in embodiments, only professors may be permitted to make mandatory meditations associated with a lecture, and students may be permitted only to make optional study-note meditations. The method 500 commences at operation 502 when a request to upload a meditation in association with a video timeline is received. In one embodiment, the request is made at a client and conveyed to an application server. The user at the client may select an existing group of meditations, i.e. a thread, to associate the upload with. For example, if the mediatation for upload is a practice problem set, the user may choose to associate the mediatation with a "Quiz" thread. In one embodiment, a user selects a button on a graphical user interface to request addition of a new mediatation. In embodiments, new mediatations can be added while the base video stream is playing. The mediatation is associated with the point on the timeline when the upload request is made until the user indicates the end of the mediatation period. For example, if the user selects the button at the thirty second mark in the timeline, the uploaded mediatation will be associated with that point of timeline and the period of associated base video stream will run until the user indicates that the period should end. Other ways to indicate the period with which a new mediatation is associated are possible. For example, the user could be presented with a pop-up menu of choices, including directly setting the time period(s) to associate it to a new mediatation. Flow proceeds to determine operation 504.

At determine operation 504, a determination is made whether the upload is a batch upload. The determination may be based on the number of mediatations uploaded. For example, a batch upload may include a number of mediatations over a given threshold. In another embodiment, a batch upload may be any upload request with more than one mediatation. If it is determined that the upload is a batch upload, flow proceeds to receive operation 506. If it is determined that the upload is not a batch upload, flow proceeds to receive operation 508.

At receive operation 506, a batch upload of mediatations are received. Batch uploads may be attractive to users who want to upload multiple mediatations at once. One such user could be a professor who delivered a video graphed lecture now being used as the base video stream. The professor may wish to upload question sets associated with different points in the video timeline. The professor may upload all the question sets at once and indicate at which periods in the timeline each practice question set should be associated with. In one embodiment, the batch mediatations are received using an optimized upload procedure such as File Transfer Protocol (FTP) or Aspera. The optimized upload procedure allows a user to drop mediatations in a predetermined location on a server. One example of such a predetermined location is a hot folder. The application on the server is constantly monitoring the hot folder and, when it detects new mediatation uploads, the mediatation uploads are added to the mediatation digital asset store, such as mediatation digital asset store 112. Flow proceeds to receive operation 508.

At receive operation 508, a single mediation is received, for example, using web based or browser based manual input. For example, a student user may wish to upload a single diagram as a mediatation in association with a particular period of the timeline. In embodiments, when the user selects a mediatation for upload at the client, the browser sends a request to the application server. The mediatation is then stored at the mediatation data store. In embodiments, the application server also creates and stores an indication (such as a preview) of the new mediatation. Flow proceeds to associate operation 510.

At associate operation 510, the mediatations are associated with one or more periods of the timeline. If a batch upload is used, each mediatation may be associated with a different period of the timeline. In another embodiment, each mediatation in a batch upload may be associated with the same period of the timeline. If a manual browser based upload is used, each mediatation is associated with a period in the timeline. In one embodiment, the application server receives metadata associated with the mediatation when the request for upload is made. This metadata is stored in the mediatation data store and is used to describe the mediatation separate from the link to the video timeline. Flow then terminates.

Figure 6:
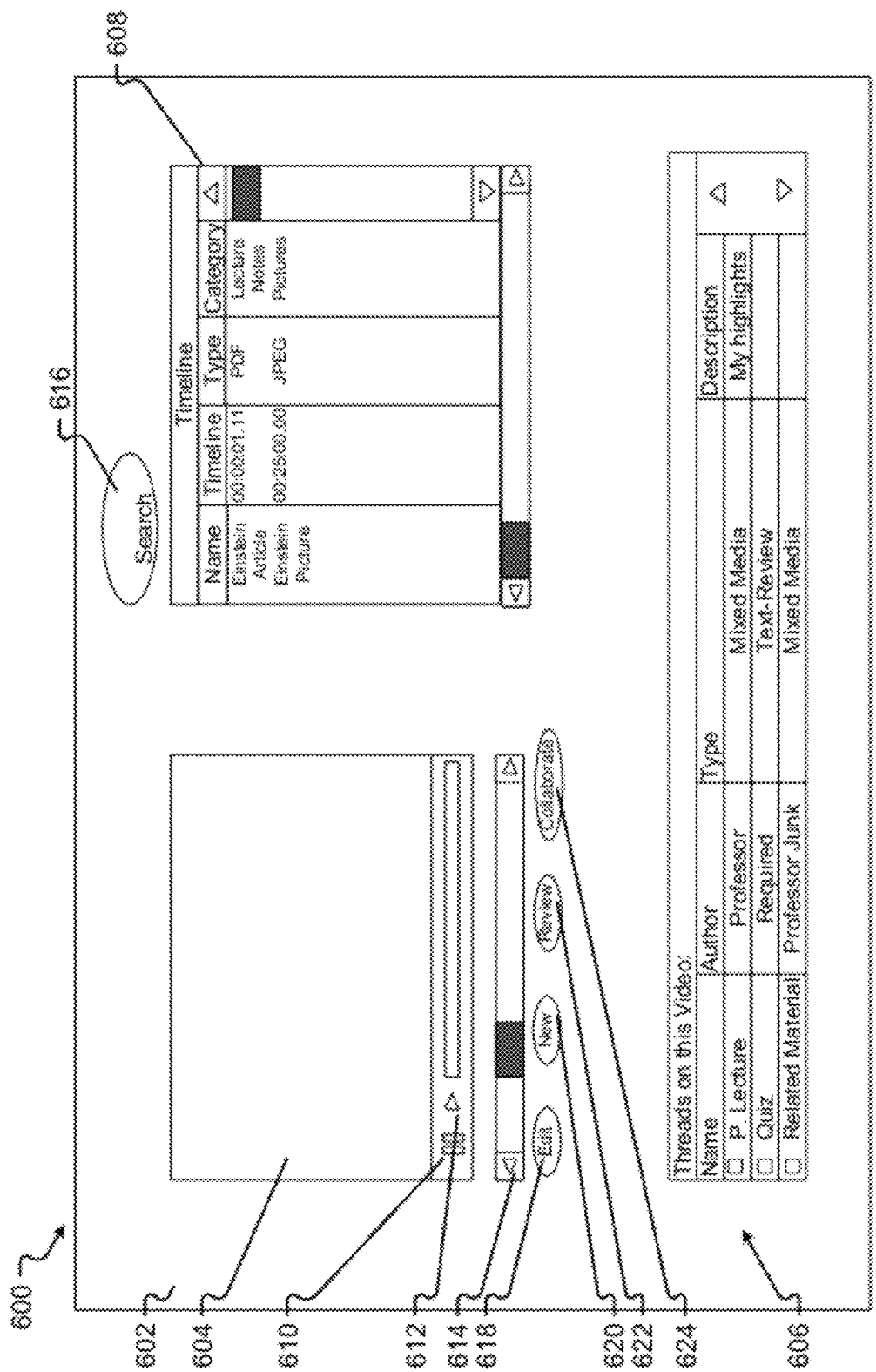
FIG. 6 is an illustration of a graphical user interface in accordance with at least one embodiment of the present application.

FIG. 6 is an illustration of a graphical user interface 600 to create, edit and manage mediatations for a video stream. In embodiments, the graphical user interface 600 is used by an administrator with rights to the base video to associate mediatations with it.

For the purposes of the foregoing discussion, the user interfaces may be accessed via any suitable means, As illustrated, the user interfaces may provide one or more windows for display and one or more elements or display areas for selection and/or input. Windows may include one or more elements, or display areas, and, additionally, may provide graphical displays, instructions, or other useful information. Elements may be displayed as buttons, tabs, icons, toggles, or any other suitable visual access element, etc., including any suitable element for input selection or control.

According to one embodiment, as illustrated by FIG. 6, administrator control user interface 600 may include administrator control window 602. Administrator control window 602 may further encompass one or more windows including a video player window 604, thread list window 606, and timeline window 608. Video player window 604 provides a window to display the video as it plays. Video player window 604 may further include one or more selectable buttons such as a pause button 610 and a play button 612. The video player window 604 may be further associated with a video timeline represented graphically by slider bar 614. Slider bar 614 displays where the currently displayed image in the video player window 604 lies in the overall video timeline for the played video. The current point in the timeline may be associated with a dark square in the slider bar 614. In the depicted embodiment, video timeline is displayed as a slider bar 614 with arrows on either end. The arrows may be selectable elements that allow a user to scroll forward or backward in the overall timeline for the played video. The dark square in the slider bar 614 may also be a selectable element that the user can drag forward or backward in the slider bar 614. When a user scrolls forward or backward in the video timeline represented by slider bar 614, the video player window 604 will display the new point in the video associated with the scrolled point in the timeline. For example, if a user scrolls forward from the beginning of the timeline to point 00:05:00, the point in the video stream associated with time 00:05:00 will be displayed in video player 604. As will be discussed further with reference to FIG. 8 and FIG. 9, scrolling the video timeline may cause one or more mediatations associated with that point in the timeline to also be displayed.

Mediatations may be sorted using either threads or categories. In one embodiment, threads are associated with a particular author while categories may include mediatations from a variety of authors. Both means of classification are within the scope of the present application and are depicted as part of administrator control user interface 600 for simplicity. Thread list window 606 displays a list of threads associated with the video displayed by the video player window 604. In one embodiment, the thread lists displayed in the thread list window 606 include a name, author, type, and description. The name is the particular thread name associated with the video stream. In one embodiment, possible thread names are determined by the administrator or other user. The author is the author of the thread associated with the thread name. As will be discussed further with reference to FIG. 8 and FIG. 9, threads may be created by different authors, such as an administrator, i.e. a professor, or an end user. Moreover, an administrator can designate an author of a thread as "required" to mandate that the thread is provided to the end user for display. In one embodiment, a "required" mediatation will be automatically inserted into every thread. The type may provide the media associated with the thread. For example, a "quiz" thread may include only text media. On the other hand, a "lecture notes" thread may include a mix of different types of media such as PDF, JPEG, text, etc. The description provides a description of the thread. For example, the "P. Lecture Notes" thread created by the professor includes a description of "My Highlights." As can be appreciated from the above description, the thread list window 606 provides an administrator with an easily viewable list of threads associated with the video currently displayed in the video player window 604. The thread list window may also include scroll arrows to access threads that are not currently displayed in the thread list window 606.

As depicted in FIG. 6, thread list window 606 may also include selectable boxes displayed next to each thread in thread list window 606 (not depicted). When a user selects a box associated with a given thread, the mediatations associated with the video stream are filtered and only those timeline points associated with the selected thread are displayed in timeline window 608 (not depicted). For example, the timeline points associated with the checked Lecture Notes thread (such as the beginning points for each period with which a mediatation in the Lecture Notes thread is associated) may be displayed in timeline window 608. Scrollbars may be located below and to the right of the timeline window 608 to allow a user to view more information in the timeline window 608. An exemplary timeline window 608 associated with a particular thread will be depicted with reference to FIG. 7.

In embodiments, timeline window 608, may be displayed with or without thread list window 606 by utilizing categories. As discussed above, categories are provided as an alternate way of filtering mediatations. As depicted in timeline window 608, a category column may be included in the timeline window 608. As will be appreciated, in this embodiment, the timeline window 608 is not tied to a particular thread but, rather, displays all mediatations associated with a base video stream. In one embodiment, the category column may be further filtered. For example, a user may right click on the category column to select a particular category for display—such lecture notes or pictures. Once a particular category is selected, only mediatations associated with that category are displayed in timeline window 608.

Administrator control window 602 may further include a search button 616. Search button 606 may be selected by an administrator to search for either videos or mediatations. In one embodiment, an administrator may access the search button 616 to search for a particular base video stream. Selecting the search button 616 may cause a second window to pop up in which an administrator can enter search terms related to a video stream. The system is then searched by the input search terms. For example, an administrator may search for "Lecture on Differential Equations." This search may return the video stream for the "Lecture on Differential Equations." In another embodiment, the administrator may search the system for a particular mediatation. For example, an administrator may search the system for "Quiz on Limits." The search may then return the video stream to which the "Quiz on Limits" is mediatation associated. In addition, when the video stream is returned, the timeline for the video may be automatically advanced and played from the beginning of the period with which "Quiz on Limits" mediatation is associated.

Administrator control window 602 may further include an edit button 618, a new button 620, a review button 622, and a collaborate button 624. Review button 622 allows an administrator to review the mediatations associated with the video stream by providing end user viewing window 802 as described with reference to FIG. 8. Providing the video stream and associated mediatations using the review button 622 allows an administrator to view the displayed media content from an end user perspective. An administrator may also configure the mediatations associated with a video stream by accessing the collaborate button 624. The collaborate button 624 allows an administrator to use mediatations from other administrators in association with the displayed video stream. For example, an administrator may access the collaborate button 624 and be provided with a window of mediatations from other administrators. The administrators may then choose, for example, a document created by another professor and associate the document mediatation with the underlying video stream.

An administrator may also access the edit button 618 and the new button 620 from the administrator control window 602. The edit button 618 may be accessed by the administrator to edit one or more mediatations associated with the video stream displayed in video player window 604. The new button 620 may be accessed by the administrator to add one or more mediatations to the video stream displayed in the video player window 604. Editing and adding mediatations using the edit button 618 and new button 620 will be discussed in further detail with reference to FIG. 7.

Figure 7:
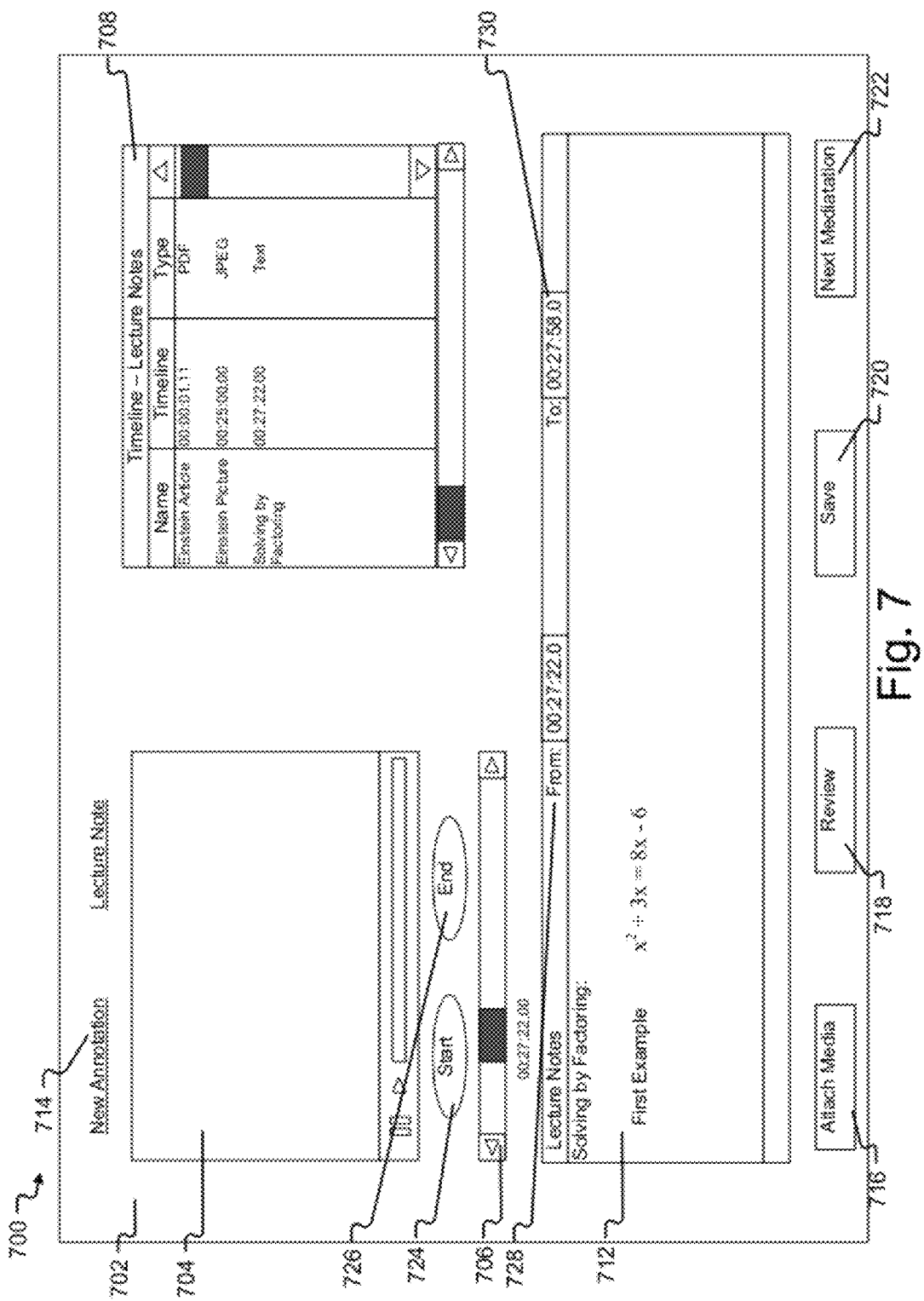
FIG. 7 is an illustration of a graphical user interface in accordance with at least one embodiment of the present application.

FIG. 7 is an illustration of administrator mediatation interface 700 provided to an administrator when the administrator accesses either edit button 618 or new button 620. For the simplicity purposes, administrator mediatation interface 700, as well end user display interface 800 and end user control interface 900, are described in terms of filtering mediatations by threads. As will be appreciated, administrator mediatation interface 700 may also filter mediatations by categories, as described with reference to administrator user interface 600.

According to one embodiment, as illustrated by FIG. 7, administrator mediatation interface 700 may include administrator mediatation window 702. Like administrator control window, 602, administrator mediatation window 702 also provides a video player window 704 and a timeline slider bar 706 associated with the video stream displayed by the video player window 704.

Administrator mediatation interface 700 depicts a timeline thread window 708 associated with the "Lecture Notes" thread. As discussed with reference to FIG. 6, if the "Lecture Notes" thread is selected from thread list window 606, the timeline thread window may filter mediatations associated with the video stream and display only mediatations associated with the selected thread. As depicted in timeline thread window 708, each point in the timeline associated with a mediatation in the Lecture Note thread is displayed. Each displayed timeline point may be further associated with a name and type in the timeline window 608. For example, the Einstein Article mediatation begins at point 00:00:01.11 is associated with a PDF type. As described with reference to FIG. 6, timeline thread window 708 may further include one or more scrollbars that allow the administrator to view additional information in the timeline thread window 708.

Administrator mediatation window 702 may further include a mediatation control window 712. Mediatation control window 712 may be used by an administrator to either add a new mediatation to a base video stream or edit a mediatation currently associated with the video stream. FIG. 7 depicts an example of a mediatation control window 712 being used to add a new a mediatation to a video stream as indicated by control status 714. Control status 714, in embodiments, may indicate "New Annotation" when the new button 618 is selected in the user interface 600 shown in FIG. 6. As depicted in mediatation control window 712, an administrator may determine the start time and end time of an associated mediatation. As depicted in FIG. 7, administrator mediatation window 702, may include a start button 724 and an stop button 726. The start button 724 and stop button 726 allow an administrator to designate a period of association for a given mediatation. In one embodiment, the administrator may select the start button 724 while a video is playing in video display window 704. In another embodiment, the administrator may slide slider bar 706 to a desired point and select the start button 724. When the administrator selects the start button 724, video play may be paused allowing the administrator to input the mediatation. In another embodiment, video play may continue while the administrator mediatates the timeline. The point in the timeline at which the administrator selects the start button 724 will be displayed as From time 728 in mediatation control window 712. For example, From time 728 in mediatation control window 712 indicates that the start button 724 was selected at 00:27:22.00. An administrator may also designate a point in the timeline as the end time of the period of association for the mediatation. In one embodiment, the administrator may select the end button 726 while the video is playing. In another embodiment, an administrator may access the scrollbar 706 to change the point of the timeline associated with the currently displayed video. The administrator may then access end button 726 to designate an end point. The designated end point may be displayed in mediatation control window 712 as To time 730. For example, FIG. 7 depicts a mediatation control window 712 that displays a To time 730 of 00:27:58.00.

The administrator may input media content into mediatation control window 712 as the mediatation associated with the input timeline period. As exemplified in FIG. 7, the administrator may input text into mediatation control window 712. The administrator, however, may input any form of media content into mediatation control window 712, as is discussed within the context of the present disclosure. For example, the administrator may browse to a file system or network location to insert data comprising a new mediatation, such as a video, image, or other file. An attach media button 716 is provided to allow an administrator such access to file systems and network locations. In addition, when the user imports data, the indication (i.e. preview) of such data to be used and displayed in relation to such mediatation may be created and displayed in mediatation control window 712.

Once an administrator adds media content and designates a timeline period for association with the video stream, administrator may select any of review button 718, save button 720, or next mediatation button 720. An administrator may access the review button 718 to view the end user experience including the newly attached mediatation. For example, the administrator may be presented with the user interface 800 depicted in, and discussed in relation to, FIG. 8. If the administrator is dissatisfied with the end user experience, the administrator may continue to edit mediatation. On the other hand, if the administrator is pleased with the end user experience, the administrator may select save button 720 to save the mediatation to the network communication system. Once the mediatation is saved, or if the administrator decides not to save the mediatation, the administrator may select next mediatation 722 to create a new mediatation.

It will be appreciated that the administrator mediatation window 702 will operate in a substantially similar manner if the administrator has chosen to edit an existing mediatation instead of adding a new mediatation. The existing mediatation will be displayed in the mediatation control window 712. The administrator may then edit the mediatation and decide to access the attach media button 716, review button 718, and/or save button 720. If the administrator accesses the next annotation button 722, the next mediatation currently associated with the timeline will be displayed to the administrator for editing.

Figure 8:
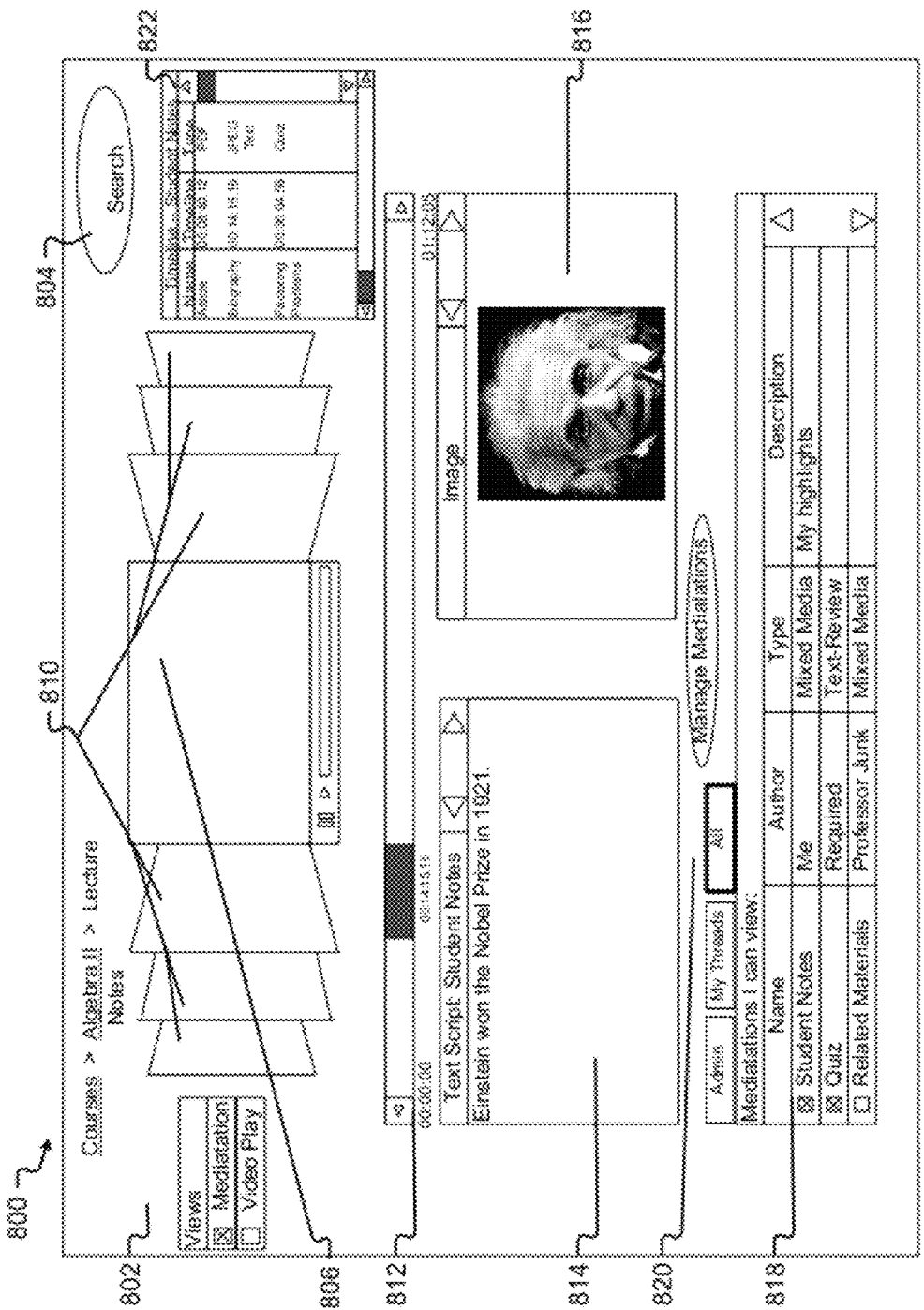
FIG. 8 is an illustration of a graphical user interface in accordance with at least one embodiment of the present application.

FIG. 8 is an illustration of end user display interface 800 provided to an end user viewing a video stream associated with one or more mediatations.

According to one embodiment, as illustrated by FIG. 8, end user display interface 800 may include end user display window 802. End user display window 802 depicts the display provided to an end user viewing playback of a video stream associated with one or more mediatations. An end user may locate a video stream by accessing search button 804. As discussed with reference to FIG. 6 above, an end user may also access the search button to locate a particular mediatation. The resultant video stream, or video stream associated with the resultant mediatation, is displayed in video player window 806.

Video player window 806 may be associated with a "cover flow view" as depicted in FIG. 8. The cover flow view displays the video player window 806 as well as thumbnails 810 of one or more associated mediatations. If a user wants to view the video at the period of the timeline associated with one of the mediatations, the user may select the mediatation thumbnail from the thumbnails 810 displayed in the cover flow view. The video display may then change to reflect the period of the video timeline associated with the selected thumbnail. In one embodiment the selected thumbnail is then displayed in either first mediatation window 814 or second mediatation window 816 as an indication of the mediatation. Display of an indication of a mediatation in either first mediatation window 814 or second mediatation window 816 will be discussed in further detail below. The cover flow is currently displayed as the end user has selected mediatation view in view selection box 812. If the end user decides instead to select video play view, the thumbnails 810 of mediatations will disappear and only the video player window 806 will be displayed where the cover flow view once was.

End user display window 802 may further include a timeline thread window 822. As discussed above, the timeline thread window 822 display points in the video timeline at which mediatations are associated. The timeline thread window 822 may further identify a type of media associated with the mediatation at that point in the video timeline. As depicted in FIG. 8, a point in the video timeline may be associated with more than one mediatation. The types of mediatations associated with a point in the video timeline may be listed in timeline thread window 822.

End user display window 802 may further include a slider bar 812 depicting the video timeline associated with the video stream. As discussed above, the timeline indicates at what point, in the overall timeline, the current video stream is playing. Slider bar 812 may also include selectable scroll bar arrows and darkened region to allow the end user to move the displayed point in the video stream forward or backwards in the timeline.

End user display window 802 may further include a first mediatation display window 814. The first mediatation display window 814 displays an indication of a first mediatation associated with a point in the timeline. As discussed above, indications of mediatations provide a preview for the mediatations. One or more mediatations may be associated with the same or different periods in the timeline. End user display window 802 displays a point in the video timeline associated with two mediatations, an indication of the first mediatation displayed in first mediatation window 814 and an indication of the second mediatation displayed in second mediatation window 816. Moreover, in embodiments, more than one indication of a mediatation may be displayed in a single divided window, such as windows 814 and 816, wherein the window (e.g. 814 or 816) may be divided into more than one display areas.

As will be appreciated, first mediatation window 814 and second mediatation window 816 may include forward and backward selection arrows. If the end user selects the forward or backward selection arrows, the previous or next mediatation will be displayed in either first mediatation window or second mediatation window. In one embodiment, selection of the forward or backward selection arrows causes the video player window 804 to display the video stream at the point in the timeline associated with the previous or next mediatation.

As will be appreciated, as the video is played and the timeline advances, indications of different mediatations associated with different points on the timeline will be displayed in first mediatation window 814 and second mediatation window 816. As will also be appreciated, indications of mediatations displayed in either first mediatation window 814 or second mediatation window 816 may be displayed for different lengths of time.

When a user wants to view a mediatation, the user may select either the first mediatation window 814 or the second mediatation window 816, depending on the mediatation the user wants to view. For example, if the user wants to see the entirety of the Albert Einstein presentation previewed as an image indication in second mediatation window 816, the user may select the second mediatation window 816. As will be appreciated, the user may select the second mediatation window 816 by clicking on the Albert Einstein image, the word "Image", or any other area of selection in or associated with the second mediatation window 816 as will be appreciated by one skilled in the art. When the user selects the indication of the mediatation, the mediatation itself will be displayed in the mediatation window. Using the above example, when the user selects the indication of a picture of Albert Einstein in second mediatation window 816, the entire Albert Einstein presentation may be provided in second mediatation window 816.

End user display window 802 may further include an available mediatations window 818. Available mediatations window 818 provides a list of mediatation threads that the end user has permission to view. The available mediatations window 818 is similar to the thread list window as discussed with reference to FIG. 6. As depicted in FIG. 8, the "Student Notes" thread is currently selected. Per this selection, mediatations in the Student Notes thread will be displayed in either first mediatation window 814 or second mediatation window 816. As will be appreciated, one or more threads may be selected for display. In one embodiment, threads that have an author of "required" are always displayed no matter which, if any, other threads are selected by the end user. As depicted with reference to FIG. 8, the Quiz thread is required. In one embodiment, available mediatation window 818 displays the Quiz thread as always selected, as is depicted by the checked box next to the Quiz thread. Additional threads may be viewed by accessing a scroll bar associated with the available mediatation window 818. Available mediatations window 818 may further include one or more tabs for sorting mediatation threads. For example, as depicted in FIG. 8, available mediatations window 818 may include an "Admin Threads" tab and a "My Threads" tab. When a user selects the "Admin Threads" tab, only those threads created by the administrator are displayed in the available mediatations window 818. If the user selects the "My Threads" tab, only those threads created, or chosen to be displayed, by the user are displayed in the available mediatations window 818. Required threads are displayed, in embodiments, regardless of user choice. In addition, the user may choose the "All" tab which causes all threads to be displayed for selection. In this case, the user has selected the "All" tab. As can be appreciated, selection of the "All" tab allows a user to further select threads created by the user and created by others for viewing.

End user display window 802 may further include a manage mediatations button 820. The manage mediatations button 820 allows a user to access user interface 900 to create and edit mediatations. User interface 900 is described in further detail with reference to FIG. 9.

Figure 9:
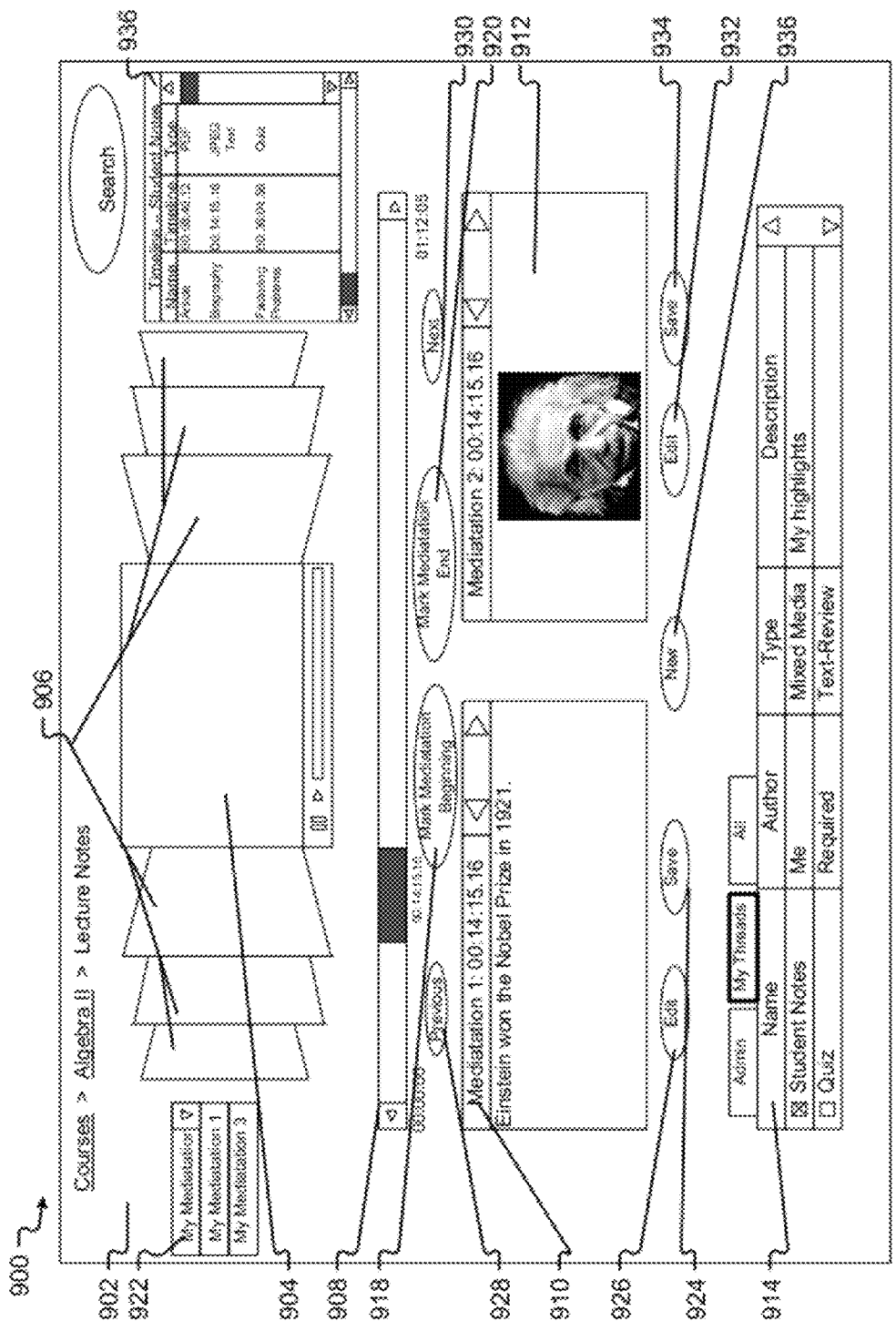
FIG. 9 is an illustration of a graphical user interface in accordance with at least one embodiment of the present application.

FIG. 9 is an illustration of an end user control interface 900 is provided to an end user so the end user can create and add his/her own mediatations associated with the video stream.

According to one embodiment, as illustrated by FIG. 9, end user control interface 900 may include end user control window 902. Like end user display window 802, end user control window 902 may include a video player window 904. Depending on the view mode as discussed with reference to FIG. 8, video player window 904 may be displayed in a cover flow view as accompanied by one or more mediatation thumbnails 906. End user display window 902 may also include a slider bar 908 representing a timeline associated with the video currently playing in video display window 904. Slider bar 908 may also include selectable scroll bar arrows and darkened region to allow the end user to move the displayed point in the video stream forward or backwards in the timeline.

End user control window 902 may further include a timeline thread window 936. As discussed above, the timeline thread window 936 display points in the video timeline at which mediatations are associated. The timeline thread window 936 may further identify a type of media associated with the mediatation at that point in the video timeline. As depicted in FIG. 9, a point in the video timeline may be associated with more than one mediatation. The types of mediatations associated with a point in the video timeline may be listed in timeline thread window 936. In embodiments, timeline thread windows, such as windows 608, 708, 822, and 936 may display the entire period of the timeline with which a mediatation has been associated (in addition to the starting point for such associated period).

End user control window 902 may further include a thread list window 914. The thread list window 914 may provide the user with a list of threads associated with the played video. The user may sort the thread list window 914 using tabs as discussed with reference to FIG. 8. As depicted in end user control window 902, the user has selected the "My Threads" tab. As a result, the list of threads has been sorted and only the "Student Notes" thread and "Quiz" thread are provided to the user in thread list window 914.

End user control window 902 may further include a first mediatation window 910 and a second mediatation window 912. As will be appreciated, less than two or more than two mediatation windows may be provided by end user control window 902 and mediatation windows 910 and 912 may be divided to display more than one mediatation or indication thereof. Using either the first mediatation window 910 or the second mediatation window 912, a user can create a new or edit an existing mediatation. In one embodiment, the end user may create new or edit existing mediatations only for a thread that the end user has permission to control. As discussed with reference to FIG. 6, permissions may be set by an administrator. For example, a user may not be allowed to control the "Quiz" thread but may have permission to control the "Student Notes" thread. An end user who wants to add or edit mediatations associated with a particular thread may select that thread from thread list window 914. In one embodiment, an end user may select a thread by selecting a check box located next to the thread. For example, as depicted by FIG. 9, an end user may select a "Student Notes" thread. The selection may then be indicated in control heading bar 916.

When an end user wants to create a new mediatation, the end user may select a new button 936. In one embodiment, once new button 936 is selected, first mediatation window 910 and second mediatation window 912 may appear without any associated media content. The user may then select the mark mediatation beginning button 918. The mark mediatation beginning button 918 is associated with the point in the timeline currently associated with the video stream. As discussed above, this timeline point may be depicted by slider bar 908. Once the end user marks the mediatation beginning point in the video timeline 908, the user may input media content into either first mediatation window 910 or second mediatation window 912. In one embodiment media content may be input by simply typing or copying and pasting into either the first mediatation window 910 or the second mediatation window 912. In another embodiment, the user may right click on either the first mediatation window 910 or the second mediatation window 912 and select a type of media that will be input. The mediatation windows may further be designated for different types of media. For example, the first mediatation window 910 may be utilized when the end user is entering text content while second mediatation window 912 may be utilized when the end user is inputting other media content.

When the end user is ready to attach the media content input in first mediatation window 910 or second mediatation window 912, the end user may select mark mediatation end button 920 to associate the mediatation with a period on the timeline. In one embodiment, the user has allowed the video display window 904 to continue to play the video while the end user inputs a mediatation and, when the video stream reaches given point, the end user may select the mark mediatation end button 920. For example, if the end user is taking notes on the chapter for "Integrals" in the lecture and the lecturer moves onto a new chapter, the end user may access the mark mediatation end button 920 to mark the end of his notes for that chapter. In another embodiment, the end user may have paused the video to take notes and may wish to advance the timeline to mark the end of the mediatation without playing the video. The end user may advance the slider bar 908 to a desired point and then access the mark mediatation end button 920 to designate the end of the period for the mediatation. If the end user is satisfied with the mediatation, the end user may save the mediatation in association with the period in the timeline by accessing save button 924. As discussed with reference to FIG. 7, once save button 924 or 934 is accessed, the indication of the mediatation will be displayed when the mediatation's thread is selected during the video stream for the designated period of the timeline.

An end user may also edit an existing mediatation using end user control window 902. In one embodiment, the end user may access the mediatation selection menu 922 to select a particular mediatation associated with the selected thread as depicted in FIG. 9. In one embodiment, the mediatation selection menu 922 may be a pull down displaying different mediatations for selection. For example, FIG. 9 displays three mediatation for selection, labeled "My Mediatation 1", "My Mediatation 2", and "My Mediatation 3." Once a mediatation is selected from the pull down, the content of the mediatation will be displayed in either first mediatation window 910 or second mediatation window 912. For example, as depicted in FIG. 9, when "My Mediatation 2" is selected from the mediatation selection window 922, the media content associated with "My Mediatation 2" is provided in first mediatation window 910. In one embodiment, when a mediatation is selected, all mediatations associated with that point in the timeline are displayed. As depicted with reference to FIG. 9, two mediatations, displayed in first mediatation window 910 and second mediatation window 912 are associated with the 00:14:15.16 point in the timeline. In another embodiment, each mediatation window may be associated with a separate mediatation and point in the timeline. In yet another embodiment, if the user accesses previous button 928 or next button 930, the previous or next mediatation associated with the timeline may be provided in either the first mediatation window 910 or the second mediatation window 912. If a user wants to change the media content associated of the mediatation, the user may access edit button 926 or edit button 932. When the user is satisfied with the edited mediatation, the user may then save the changes by accessing the save button 924 or save button 934.

Figure 10:
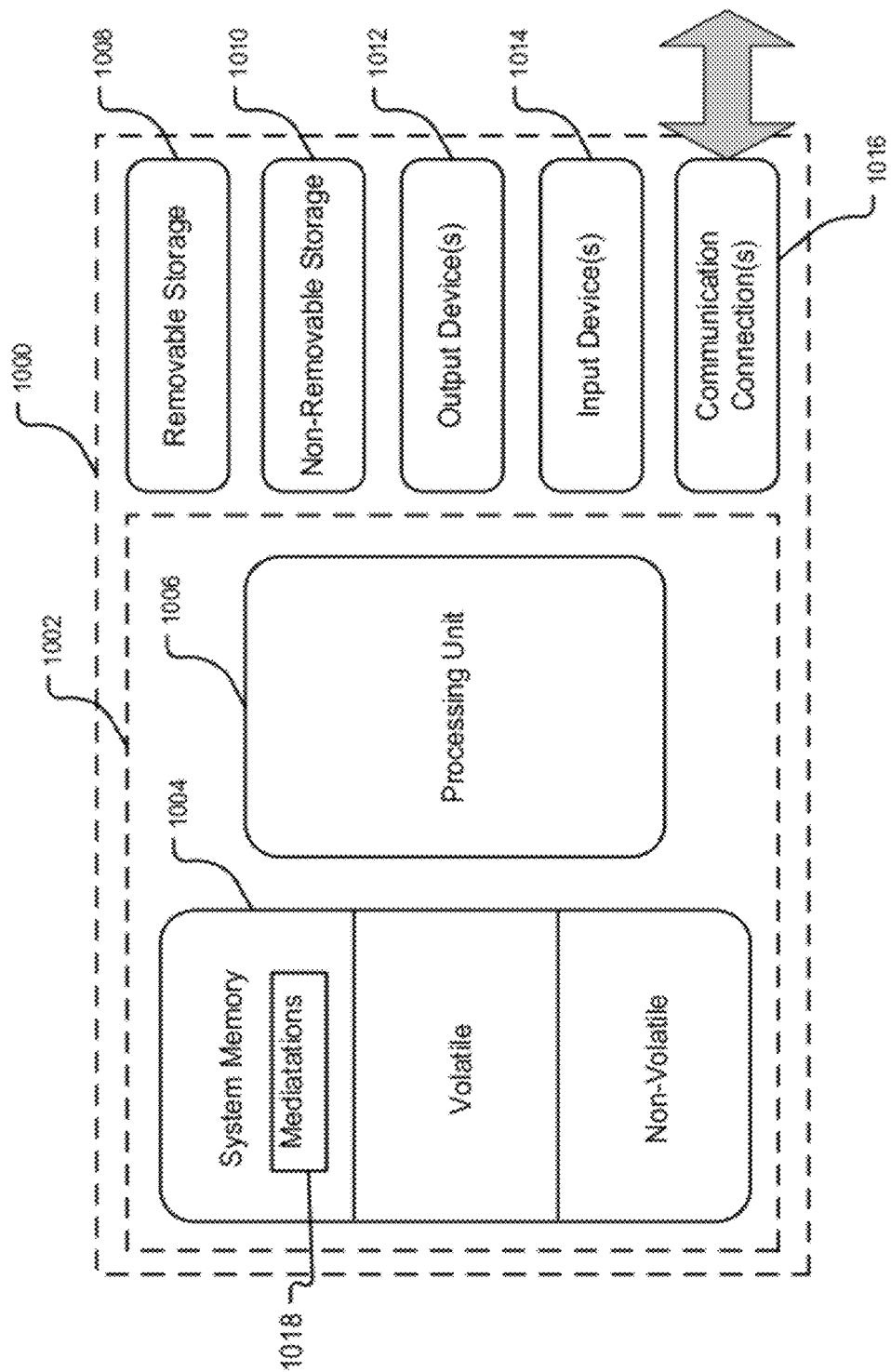
FIG. 10 is a block diagram illustrating an embodiment of a suitable computer system for associating one or more mediatations with a video timeline.

FIG. 10 is a block diagram illustrating an embodiment of a suitable computer system for associating one or more mediatations with a video timeline.

With reference to FIG. 10, a suitable computer system for implementing aspects of a web browser based application may include one or more computing devices, such as computing device 1000. In general, computing device 1000 includes at least one processing unit 1006 and memory 1004. Depending on the configuration and type of computing device, memory 1004 may be volatile (such as RAM), nonvolatile (such as ROM, flash memory, etc.), or some combination of the two and may store information in accordance with the present disclosure, such as mediatations 1018. A basic configuration of the computing device 1000 is illustrated in FIG. 10 by dashed line 1002.

Additionally, computing device 1000 may also have additional features and/or functionality. For example, computing device 1000 may include additional storage, for example, removable storage 1008 and non-removable storage 1010. Computer storage media may include non-transitory, volatile and nonvolatile, removable and non-removable media implemented in any method or technology for storage of information, such as computer-executable instructions, data structures, program modules, or other data. Memory 1004, removable storage 1008, and non-removable storage 1010 are all examples of computer storage media. For example, computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can accessed by computing device 1000. The described computer storage media are provided by way of example only and any such suitable computer storage media may be associated with computing device 1000.

Computing device 1000 may also contain communications connection(s) 1016 that allow the computing device to communicate with other devices. Communications connection(s) 1016 is an example of communication media. Communication media typically embodies computer readable instructions, data structures, program modules or other data in a modulated data signal such as a carrier wave or other transport mechanism and includes any information delivery media. The described communications connections and media are provided by way of example only and any suitable means of communicating between computer systems may be utilized within the spirit of the present disclosure.

Computing device 1000 may also include input device(s) 1014 such as a keyboard, mouse, pen, voice input device, touch input device, etc. Output device(s) 1012 such as displays, speakers, printer, etc., may also be included.

The computing device 1000 may operate in a networked environment using logical connections to one or more remote computing devices (not shown). A remote computing device may include any suitable computer system, such as a personal computer, a server computer system, a router, a network PC, a peer device, or other common network node, and typically includes many or all of the elements described above relative to the computing device 1000. The logical connections between the computing device 1000 and the remote computer may include a local area network (LAN) or a wide area network (WAN), or any other suitable network. For example, such networks may include enterprise-wide computer networks, intranets, and the Internet. The described network connections are provided by way of example only and any suitable means of establishing a communications link between computer systems may be used.

Communication between components of a computer system may be conducted over a distributed network, as described above, via wired or wireless access. For example, the present methods may be configured as a layer built over the TCP/IP protocol. TCP/IP stands for "Transmission Control Protocol/Internet Protocol" and provides a basic communication language for many local networks (such as intra- or extranets) and is the primary communication language for the Internet. Specifically, TCP/IP is a bi-layer protocol that allows for the transmission of data over a network. The higher layer, or TCP layer, divides a message into smaller packets, which are reassembled by a receiving TCP layer into the original message. The lower layer, or IP layer, handles addressing and routing of packets so that they are properly received at a destination. Again, the described computing device, network functionality, etc., are provided for purposes of example only and any suitable computing system operating over any suitable network may be utilized by embodiments as described herein.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described.

While various embodiments have been described for purposes of this disclosure, various changes and modifications may be made which are well within the scope of the present invention. Numerous other changes may be made which will readily suggest themselves to those skilled in the art and which are encompassed in the spirit of the disclosure and as defined in the appended claims

We claim:

1. A method for synchronizing display of media content with a video timeline, the method comprising:

receiving a base video stream, wherein the base video stream is streaming from a server;

receiving a list of one or more threads, each thread of the one or more threads associated with a user;

displaying a thread window separate from the base video stream, wherein the thread window displays a first thread and a second thread, wherein the first thread is associated with one or more mediatations selected by a first user and the second thread is associated with one or more mediatations selected by a second user;

receiving, at the thread window, a selection of the first thread, wherein the first thread includes a first mediatation;

receiving a list of one or more mediatations from the first thread, wherein the list of one or more mediatations is separate from the base video stream and separate from the thread window;

playing the base video stream, including displaying the base video stream;

monitoring the video timeline while the base video stream is playing;

receiving a first indication of the first mediatation, wherein the first indication provides a preview of the first mediatation separate from the base video stream;

displaying the first indication of the first mediatation when the video timeline is within a first period of the timeline;

receiving a command to display the first mediatation;

requesting the first mediatation;

receiving the first mediatation displaying the first mediatation separate from the base video stream and separate from the list of one or more mediatations;

receiving, at the thread window, a selection of the second thread, wherein the second thread includes the second mediatation;

updating the list of mediatations to reflect the one or more mediatations in the second thread;

receiving, at the list of mediatations, a selection of a second mediatation, wherein the second mediatation is associated with a second period of the timeline;

in response to the command to display the second mediatation, advancing the base video stream to the second period of the timeline;

requesting the second mediatation;

receiving the second mediatation; and displaying the second mediatation separate from the base video stream.

2. The method of claim 1, wherein the first indication of the first mediatation is a thumbnail that comprises a link to the first mediatation.

3. The method of claim 1, wherein receiving the list of one or more mediatations further comprises filtering the list of one or more mediatations by classification.

4. The method of claim 1, further comprising:

receiving a selection of the second period of the timeline;

receiving a request to associate a third mediatation with the second period of the timeline; and associating the third mediatation with the second period of the timeline; and displaying a third indication of the third mediatation when playback of the base video stream is within the second period of the timeline.

5. The method of claim 1, wherein the list of one or more mediatations includes a plurality of authors of the one or more mediatations, the method further comprising:

receiving a selection in the list of one or more mediatations of a first author of the plurality of authors; and filtering the list of one or more mediatations to display in the list only one or more mediatations associated with the first author.

6. The method of claim 5, wherein the first mediatation is authored by the first author and a third mediatation in the list of one or more mediatations is authored by a second author and is associated with the second period of the timeline, the method further comprising, after the step of filtering, not displaying a third indication of the third mediatation during the second period of the timeline.

7. A method for synchronizing display of media content with a video timeline, the method comprising:
streaming a base video stream from a server;
sending a list of one or more threads for display separate from the base video stream, wherein each thread of the one or more threads is associated with a user, and wherein the list of one or more threads comprises a first thread associated with one or more mediatations selected by a first user and a second thread associated with one or more mediatations selected by a second user;
receiving a request for a list of one or more mediatations in the first thread, wherein the one or more mediatations are not incorporated into the base video stream;
sending the list of one or more mediatations to the client;
receiving confirmation that the base video is playing at the client;
determining a first mediatation from the list of one or more mediations, wherein the first mediatation is associated with a first period in a timeline of the base video stream;
monitoring the timeline;
upon reaching the first period in the timeline, retrieving a first indication of the first mediatation associated with the first period in the timeline, wherein the first indication provides a preview of the first mediatation separate from the base video stream;
sending the first indication of the first mediatation to the client for display separate from the list of mediatations and the thread window;
receiving a request for the first mediatation;
sending the first mediatation to the client for display separate from the base video stream, list of mediatations, and the thread window;
receiving a request to update the list of mediatations with one or more mediatations associated with the second thread;
determining a second mediatation from the list of one or more mediatations, wherein the second mediatation is associated with a second period in a timeline of the base video stream;
advancing the base video stream to the second period of the timeline;
upon reaching the second period in the timeline, retrieving a second indication of the second mediatation associated with the second period in the timeline, wherein the second indication provides a preview of the second mediatation separate from the base video stream; and
sending the second indication of the second mediatation to the client for display.

8. The method of claim 7, wherein the first indication of the first mediatation is a thumbnail that comprises a link to the first mediatation.

9. The method of claim 7, wherein the list of one or more mediatations comprises different types, wherein the different types include portable document format (PDF), word files, and picture files.

10. The method of claim 7, further comprising:
receiving an upload of a mediatation with a period in the timeline; and
storing the mediatation separately from the base video stream; and
storing a link between the mediatation and the period in the timeline such that the mediatation is associated with the period in the timeline for display.

11. The method of claim 7, further comprising:
receiving confirmation that the base video stream has stopped playing at the client;
pausing the monitoring of the list of one or more mediatations;
receiving confirmation that the base video stream is playing at a new period in the timeline; and
monitoring the list of one or more mediatations from the new period in the timeline.

12. The method of claim 7, further comprising:
receiving confirmation that the list of mediatations at the client has been filtered by a first author;
determining a third mediatation by a first author from the list of one or more mediations, wherein the third mediatation is associated with a third period in the timeline of the base video stream;
upon reaching the third period in the timeline, retrieving a third indication of the third mediatation associated with the first author;
sending the third indication of the third mediatation to the client for display.

13. A system for synchronizing display of media content with a video timeline, the system comprising:
at least one processor; and
a memory, communicatively coupled to the at least one processor and containing instructions that, when executed by the at least one processor, perform a method, the method comprising:
receiving a base video stream, wherein the base video stream is streaming from a server;
receiving a list of one or more threads, each thread of the one or more threads associated with a user;
displaying a thread window separate from the base video stream, wherein the thread window displays a first thread and a second thread, wherein the first thread is associated with one or more mediatations selected by a first user and the second thread is associated with one or more mediatations selected by a second user;
receiving, at the thread window, a selection of the first thread, wherein the first thread includes a first mediatation;
receiving a list of one or more mediatations from the first thread, wherein the list of one or more mediatations is separate from the base video stream and separate from the thread window;
playing the base video stream, including displaying the base video stream;
monitoring the video timeline while the base video stream is playing;
receiving a first indication of the first mediatation, wherein the first indication provides a preview of the first mediatation separate from the base video stream;
displaying the first indication of the first mediatation when the video timeline is within a first period of the timeline;
receiving a command to display the first mediatation;
requesting the first mediatation;
receiving the first mediatation displaying the first mediatation separate from the base video stream and separate from the list of one or more mediatations;

receiving, at the thread window, a selection of the second thread, wherein the second thread includes the second mediatation;

updating the list of mediatations to reflect the one or more mediatations in the second thread;

receiving, at the list of mediatations, a selection of a second mediatation, wherein the second mediatation is associated with a second period of the timeline;

in response to the command to display the second mediatation, advancing the base video stream to the second period of the timeline;

requesting the second mediatation;

receiving the second mediatation; and displaying the second mediatation separate from the base video stream.

14. The system of claim 13, wherein the first indication of the first mediatation is a thumbnail that is comprises a link to the first mediatation.

15. The system of claim 13, wherein receiving the list of one or more mediatations further comprises filtering the list of one or more mediatations by classification.

16. The system of claim 13, further comprising:
receiving selection of a third mediatation from the list of one or more mediatations, wherein the third mediatation is associated with a second period of the timeline;
advancing the base video stream to the second period of the timeline; and
displaying, during the second period of the timeline, an indication of the third mediatation separate from the base video stream.

17. The system of claim 13, further comprising:
receiving a selection of a second period of the timeline;
receiving a request to associate a third mediatation with the second period of the timeline;
associating the third mediatation with the second period of the timeline; and
displaying an indication of the third mediatation when playback of the base video stream is within the second period of the timeline.

18. The system of claim 13, wherein the list of one or more mediatations includes a plurality of authors of the mediatations, the method further comprising:
receiving a selection in the list of a first author of the plurality of authors; and
filtering the list of one or more mediatations to display in the list only mediatations associated with the first author.

19. The system of claim 18, wherein the first mediatation is authored by a first author and a third mediatation in the list of one or more mediatations is authored by a second author and is associated with the second period of the timeline, the method further comprising, after the step of filtering, not displaying an indication of the third mediatation during the second period of the timeline.

20. The system of claim 13, wherein mediatations associated with the first author are required for display in association with the base video stream.

* * * * *